United States Patent [19]

Plamper

[11] 4,102,219
[45] Jul. 25, 1978

[54] FAIR-LEADS FOR A CONTROL WIRE
[75] Inventor: Gerhard R. Plamper, Valley City, Ohio
[73] Assignee: MTD Products Inc., Cleveland, Ohio
[21] Appl. No.: 826,023
[22] Filed: Aug. 19, 1977
[51] Int. Cl.² ............................................. F16C 1/10
[52] U.S. Cl. .................................. 74/502; 254/190 D
[58] Field of Search ...................... 254/190 R, 190 D; 293/3; 74/506, 489, 491, 501 R, 502; 280/289 H, 289 R; 29/200 C, 267, 282, 234, 237

[56] References Cited
U.S. PATENT DOCUMENTS

| | | | |
|---|---|---|---|
| 575,936 | 1/1897 | Roso | 74/489 |
| 2,964,965 | 12/1960 | Hanson | 74/502 |
| 3,143,353 | 8/1964 | Henningsen et al. | 74/502 |
| 3,492,031 | 1/1970 | Henning | 74/501 R |
| 3,528,313 | 9/1970 | Berno | 74/501 R |
| 3,752,008 | 8/1973 | Danek | 74/501 R |

Primary Examiner—Trygve M. Blix
Assistant Examiner—Kenneth W. Noland
Attorney, Agent, or Firm—Woodling, Krost, Granger & Rust

[57] ABSTRACT

Fair-leads for a control wire of a Bowden type cable to be run through a hollow tube of a tubular structure or frame such as the frame of a bicycle or other vehicle whereby the wire is carried and protected interiorly of such tube, the fair-leads being retained in position in a side wall of the tube by the tension of the wires extending through the fair-leads. This is an abstract only of the specific illustration of the invention given by way of example and is not to be used in the interpretation of the claims nor as a limitation on the scope of the invention.

6 Claims, 5 Drawing Figures

FAIR-LEADS FOR A CONTROL WIRE

An object of the invention is to accommodate a control wire of a Bowden type cable within a hollow tube to protect the wire rather than having the wire mounted externally along the tube.

Another object is to enhance the appearance of a tube of such a structure or frame by obviating the appearance of clips, bands or clamps binding the control wire to the outside of the tube along the length thereof.

A still further object is the provision of fair-leads constructed and mounted so as to be readily positioned and maintained for the entrance of such a control wire into a hollow tube and for the exit of such a control wire from the hollow tube and facilitating movement of the wire within and longitudinally of the tube.

Other objects and a fuller understanding of this invention may be had by referring to the following description and claims, taken in conjunction with the accompanying drawings in which:

Figure 1:
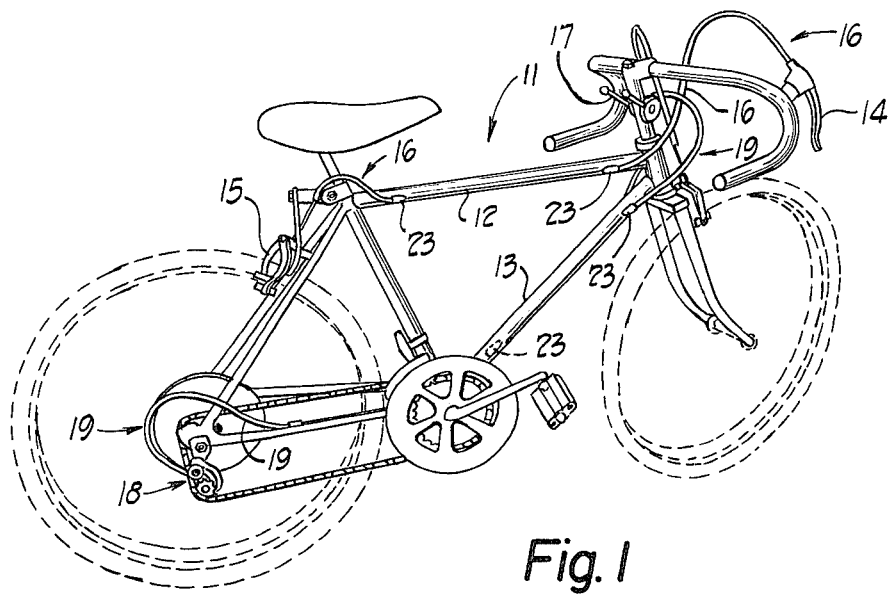
FIG. 1 is perspective view of a bicycle incorporating my invention.
Figure 2:
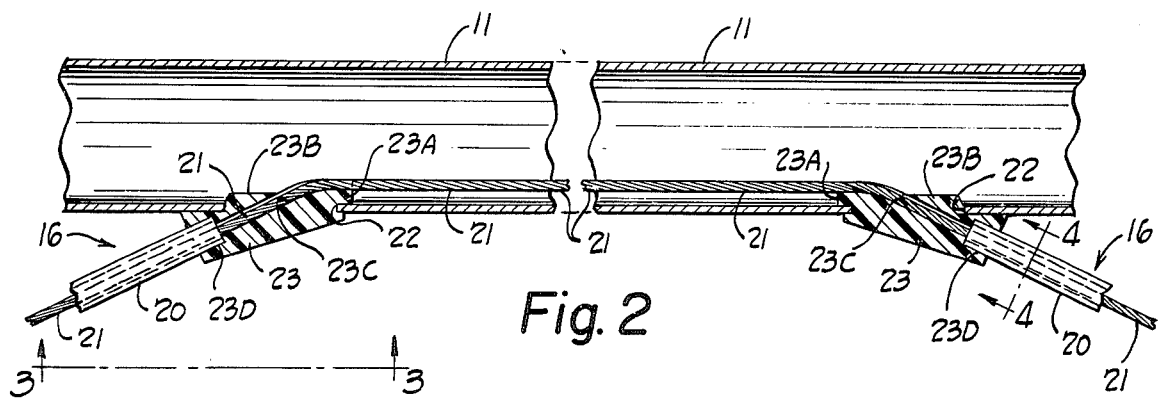
FIG. 2 is a longitudinal sectional view of the upper horizontal or reach tube of the frame of the bicycle shown in FIG. 1, and showing detail of my invention.
Figure 3:
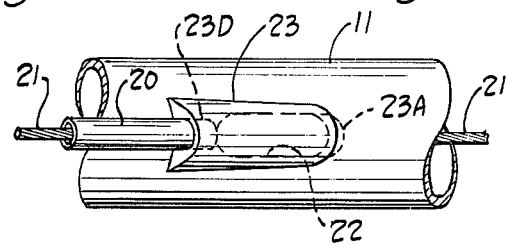
FIG. 3 is a view looking up at the bottom of the tube, in the direction of the arrows 3—3 of FIG. 2, at the left hand end of FIG. 2.
Figure 4:
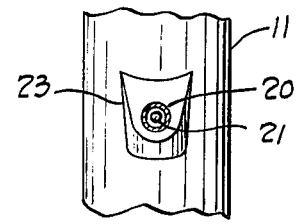
FIG. 4 is a view looking in the direction of the arrows 4—4 at the right hand end of FIG. 2.

The bicycle shown in FIG. 1, denoted generally by the reference character 11, has a frame comprising several hollow tubes including an upper horizontal or reach hollow tube 12 and a diagonal bracing hollow tube 13.

The bicycle 11 is equipped with brakes of the caliper type, the brake mechanism adjacent the rear wheel of the bicycle being denoted by the reference character 15. A brake operating lever mechanism 14 is mounted on the bicycle handle bars in position to be operated by the bicycle rider.

A Bowden type cable denoted by the reference character 16 is connected between the brake operating lever mechanism 14 and the brake mechanism 15 whereby the brake mechanism 15 is operated by manipulation of the brake operating lever mechanism 14. There is a spring included in the brake mechanism 15 whereby there is constant spring tension exerted on the control wire 21 in the Bowden cable 16.

Mounted on the bicycle adjacent the handle bars is an operating lever mechanism 17 for controlling the speed control mechanism 18 of the derailleur type mounted on the bicycle adjacent the rear wheel.

A Bowden type cable 19 connects the speed control mechanism 18 with the operating lever mechanism 17 whereby the speed control mechanism 18 is operated by the manual operation of the operating lever mechanism 17 by the bicycle rider. There is a spring included in the mechanism 18 whereby there is constant spring tension exerted on the control wire 21 in the Bowden type cable 19.

The Bowden type cable 16 within the tube 12 and the Bowden type cable 19 within the tube 13 are similar in that each comprises a flexible wire or rod 21, usually of steel, encased in a flexible sheath 20, usually of suitable plastic or metal. The fit of the wire 21 within the sheath 20 is such that the wire 21 may readily be pulled or pushed along within the sheath 20 as is well known for Bowden type cables.

Taking the upper horizontal hollow tube 12 as an example, a pair of oval shaped openings 22 are provided, by stamping, drilling or other means, in a side wall of tube 12 at spaced locations longitudinally of the tube as indicated in the drawing.

Mounted in each of these spaced openings 22 is a fair-lead 23. The fair-leads are preferably made of blocks of nylon or similar plastic which is hard but slightly yieldable and which has good anti-friction characteristics so as to permit sliding of wire 21 therethrough.

Each fair-lead 23 has an inner portion 23-B adapted to be positioned within the tube at a respective opening 22 in the tube. This inner portion 23-B has a shoulder 23-A which is positioned at one end of the inner portion 23-B to overlap and abut the inner wall of the tube adjacent the edge of the opening as shown. The other end of the inner portion 23-B is dimensioned to snugly fit within the tube but may be moved radially in and out of the opening when there is no tension imposed on the fair-lead by the wire 21.

Extending through the fair-lead 23 is a bore 23-C through which the wire 21 extends and which permits the wire 21 to slide longitudinally through the bore 23-C. It is to be noted that the bore 23-C is disposed at an acute angle to the axis of the tube, preferably an acute angle of about 25°. The bore 23-C of each fair-lead 23 of a pair of spaced fair-leads 23 in a tube, such as shown in the drawing, is inclined toward the other fair-lead of the pair. In other words, the respective bores 23-C of each pair of longitudinally spaced fair-leads 23 are inclined toward each other, as better illustrated in the drawing.

In the preferred form of the invention shown in FIGS. 1–4, the sheath 20 is absent from the control wire 21 as it extends through the tube. However, exteriorly of the tube, the wire 21 is encased in sheath 20. To accommodate and hold the sheath 20 just outside of each fair-lead 23 and to form an abutment for the free end of the sheath 20, a recess 23-D is formed in the fair-lead 23 at the entrance of the bore 23-C whereby the recess 23-D forms an enlargement of the bore for accommodating the end portions of the sheath 20 while permitting the wire 21 to extend through, and to move along, both the sheath 20 and bore 23-C.

Figure 5:
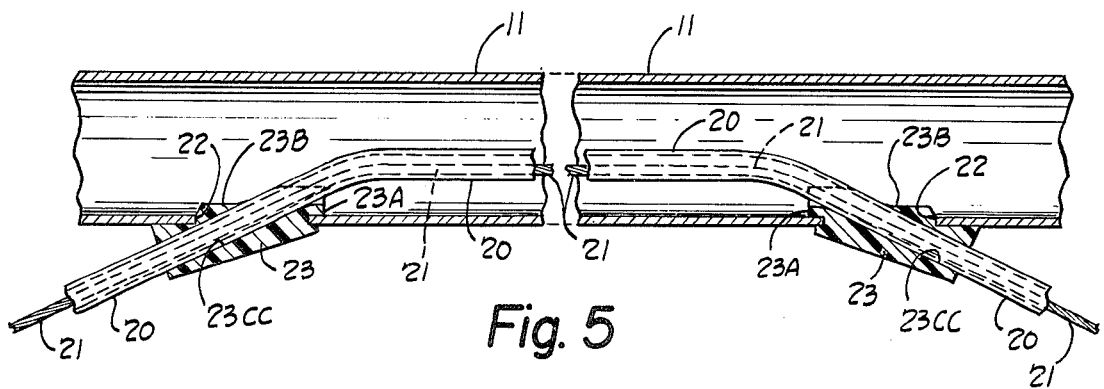
FIG. 5 is a longitudinal sectional view similar to that of FIG. 2, but in which the sheath, in which the control wire is encased, extends through the fair-leads and the tube.

In the modified form of the invention shown in FIG. 5, the recess is enlarged throughout the longitudinal extent of the fair-lead 23, so as to provide a bore for both the sheath 20 and the wire 21 through the fair-lead 23. This enlarged recess is denoted by the reference character 23-CC. In this modified form of the invention, the sheath 20 extends along the entire length of the wire 21 and through the tube 12 and inserted into the spaced openings to the positions shown in the drawing while the wire 21 is not under tension and readily capable of being manipulated. In the preferred form of the invention (FIGS. 1–4), the wire 21 is inserted through the bores of both of the spaced and oppositely facing fair-leads and the opposed ends of the sheath 20 are positioned in the recesses 23-D of the spaced fair-leads 23.

When the wire 21 is not under tension, the fair-leads 23 may be readily mounted to the positions shown by first inserting through the respective openings 22 spaced apart in tube 12 the inner portions 23-B at the shoulders 23-A to locate the shoulders against the inner surface of the tube side wall to where illustrated. Until there is tension on the wire 21 the ends of the inner portions opposite of the ends of the shoulders 23-A may be readily moved in and out of the tube through the openings. This facilitates the mounting and the demounting of the fair-leads to the tube at the spaced apart openings.

After tension is put on the wire 21, the drag or pull imposed on the fair-leads 23 by the wire 21 tends to pull or urge the spaced-apart fair-leads toward each other and to pull or press the two fair-leads inwardly of the tube 12 and thus to be firmly retained in the mounted position shown.

In the modified form of the invention shown in FIG. 5, the mounting and demounting of the fair-leads to the tube is the same as in the case of the preferred form illustrated in FIGS. 1–4. However, in the form of FIG. 5, both the wire 21 and sheath 20 encasing the wire 21 along its full length are threaded or inserted together through the enlarged recesses 23-CC of the modified form of fair-leads 23 there employed, and through the tube from fair-lead to fair-lead. The maintenance of the fair-leads in mounted position is similarly done by the tension on the wire 21.

By means of my invention, the Bowden cable used to operate the speed control mechanism and the Bowden cable used to operate the brake mechanism are protected by being housed within the tubes. Also, the appearance of the bicycle is enhanced by eliminating the need for the Bowden cable to be clipped, banded or clamped along the exterior walls of the tubes, and the elimination of such unattractive clips, bands or clamps.

The present disclosure includes that contained in the appended claims, as well as that of the foregoing description.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A fair-lead for a control wire of a Bowden cable running through an elongated hollow tube of a vehicle incorporating supporting frame structure by said hollow tube, the said hollow tube having formed in a side wall thereof, at spaced locations along the length thereof, openings providing access to the interior of the hollow tube through the side wall, said control wire being under tension in said hollow tube, said fair-lead comprising a guiding block for each of said openings and having an outer portion of an expanse greater than the expanse of a said opening and adapted to overlay the tube wall at said opening to resist movement of the said outer portion of the block through said opening into the hollow tube, said block having a bore provided therein accommodating said wire entering the hollow tube through said opening and permitting said wire to slidably move through the guiding block, said bore being directed to be disposed on an incline at an acute angle to the axis of said hollow tube upon mounting of the block to the tube at said opening, said block having an inner portion adapted to be inserted into said hollow tube through said opening, said inner portion having a shoulder at one end thereof adapted to overlap the said side wall of the tube within the tube to prevent removal of the block at said one end in a direct movement radially outward of the tube, the other end of the said inner portion of the block being dimensioned to be moved into and out of the tube through said opening in a direct movement radially of the tube, the said block being mountable to said tube by inserting the shoulder of said inner portion of the block into the said opening at the end thereof directed toward another opening in the tube accommodating another such fair-lead through which the said control wire extends, tension on the said control wire holding the said shoulder overlapped against the side wall inwardly and the inner portion within the tube, the control wire under tension and extending at said acute angle through the bore of the block urging the block toward said other opening to hold the block to the tube at said opening with the said inner portion within the tube.

2. A fair-lead as claimed in claim 1 and in which the control wire is encased in a sheath through which the wire moves along the axis of the sheath, and in which the bore in said fair-lead is of a dimension sufficient to permit the sheath, as well as the control wire, to extend through the fair-lead.

3. A fair-lead as claimed in claim 1 and in which the control wire exteriorly of the tube is encased in a sheath through which the wire moves along the axis of the sheath, and the wire interiorly of the tube is not encased in a sheath, the said block having a recess at the said other end at the entrance to the bore exteriorly of the tube for accommodating the sheath and forming an abutment for the end of the sheath.

4. In a vehicle such as a bicycle or the like having an elongated tube as part of its structure and having a Bowden type control wire under tension operable by the operator for controlling a function of the vehicle, the said tube having a pair of openings in the side wall thereof at spaced locations along the tube, the combination of a pair of fair-leads mounted in said openings, respectively, for guidance of the control wire to within the tube at one of said openings and outwardly from the tube at the other of said openings, said fair-leads having bores extending therethrough for accommodating said control wire, the bore in said each of said fair-leads being at an acute angle to the axis of the tube and being inclined toward the other of said fair-leads whereby the control wire extends through the fair-leads at such acute angles and the wire under tension urges the fair-leads in said openings toward each other, each said fair-lead interiorly of the tube at the end of the fair-lead directed toward the other fair-lead in the other opening having a shoulder overlapping the inner side wall of the tube at such end to resist movement of the fair-lead outwardly of the tube in a direction radially outward of the tube, the wire under tension exerting such a component of force on the fair-lead as to urge the fair-lead radially inwardly of the tube and to press against the outer side wall of the tube, the fair-lead at the other end directed away from the other opening.

5. The combination of fair-leads as claimed in claim 4 and in which the control wire is encased in a sheath through which the wire moves along the axis of the sheath, and in which the bores in said fair-leads are of dimensions sufficient to permit the sheath, as well as the control wire, to extend through the fair-leads.

6. The combination as claimed in claim 4 and in which the control wire exteriorly of the tube is encased in a sheath through which the wire moves along the axis of the sheath, and the wire interiorly of the tube is not encased in a sheath, the said fair-leads each having a recess at the entrances to the respective bores thereof exteriorly of the tube for accommodating the sheaths exteriorly of the tube and forming an abutment for the ends of the sheaths.

* * * * *